US011277890B2

(12) United States Patent
Niklasson et al.

(10) Patent No.: US 11,277,890 B2
(45) Date of Patent: Mar. 15, 2022

(54) MICROWAVE HEATING APPARATUS AND METHOD OF OPERATING SUCH A MICROWAVE HEATING APPARATUS

(71) Applicant: Whirlpool Corporation, Benton Harbor, MI (US)

(72) Inventors: Olle Niklasson, Finspong (SE); Hakan Carlsson, Norrkoping (SE); Ulf Nordh, Norrkoping (SE); Fredrik Hallgren, Kolmarden (SE)

(73) Assignee: Whirlpool Corporation, Benton Harbor, MI (US)

( * ) Notice: Subject to any disclaimer, the term of this patent is extended or adjusted under 35 U.S.C. 154(b) by 743 days.

(21) Appl. No.: 15/919,400

(22) Filed: Mar. 13, 2018

(65) Prior Publication Data

US 2018/0206297 A1   Jul. 19, 2018

Related U.S. Application Data

(62) Division of application No. 13/280,018, filed on Oct. 24, 2011, now Pat. No. 9,930,732.

(30) Foreign Application Priority Data

Oct. 22, 2010 (EP) .................................. 10188461

(51) Int. Cl.
  *H05B 6/70* (2006.01)
  *H05B 6/68* (2006.01)
  *H05B 6/72* (2006.01)
(52) U.S. Cl.
  CPC ............. *H05B 6/705* (2013.01); *H05B 6/682* (2013.01); *H05B 6/686* (2013.01); *H05B 6/688* (2013.01);

(Continued)

(58) Field of Classification Search
  CPC .... H04B 7/2621; H04W 16/14; H04W 16/24; H04W 16/12; Y02D 70/449
  See application file for complete search history.

(56) References Cited

U.S. PATENT DOCUMENTS 3,521,019 A   7/1970   White
3,670,134 A   6/1972   Bucksbaum
(Continued)

FOREIGN PATENT DOCUMENTS

WO     WO 02/35886     5/2002

*Primary Examiner* — Ibrahime A Abraham
*Assistant Examiner* — Gyounghyun Bae
(74) *Attorney, Agent, or Firm* — Diederiks & Whitelaw, PLC.

(57) ABSTRACT

A microwave heating apparatus and a method of operating a microwave heating apparatus are provided. The microwave heating apparatus comprises a load receiving cavity, at least one microwave source, a plurality of feeding ports connected to the microwave source and the cavity for feeding microwaves to the cavity, a measuring unit and a control unit. The measuring unit measures, for at least one frequency or within a frequency range, the power of microwaves reflected back to the microwave source for at least part of the plurality of feeding ports. The control unit selects at least one of the feeding ports based on the measured powers of the reflected microwaves in order to feed microwaves to the cavity via the at least one selected feeding port during operation of the microwave heating apparatus at the at least one frequency or within the frequency range.

20 Claims, 3 Drawing Sheets

(52) U.S. Cl.
CPC ............... *H05B 6/701* (2013.01); *H05B 6/72* (2013.01); *H05B 2206/044* (2013.01); *Y02B 40/00* (2013.01)

(56) References Cited

U.S. PATENT DOCUMENTS

| | | | |
|---|---|---|---|
| 4,340,796 A * | 7/1982 | Yamaguchi | G01K 1/024 |
| | | | 219/516 |
| 4,795,871 A | 1/1989 | Strattan et al. | |
| 4,914,651 A * | 4/1990 | Lusignan | H04B 7/2621 |
| | | | 370/329 |
| 5,417,494 A | 5/1995 | Kempa et al. | |
| 5,530,412 A | 6/1996 | Goldblum | |
| 5,828,040 A | 10/1998 | Risman | |
| 5,889,264 A | 3/1999 | Kidblad et al. | |
| 6,137,095 A * | 10/2000 | Kashimoto | H05B 1/0266 |
| | | | 219/678 |
| 6,274,859 B1 * | 8/2001 | Yoshino | H05B 6/6411 |
| | | | 219/746 |
| 6,403,939 B1 | 6/2002 | Fagrell | |
| 6,469,286 B1 | 10/2002 | Nobue et al. | |
| 6,884,979 B1 * | 4/2005 | Torngren | H05B 6/686 |
| | | | 219/697 |
| 7,214,914 B1 | 5/2007 | Isaksson et al. | |
| 8,290,020 B2 * | 10/2012 | Liu | H04B 15/04 |
| | | | 375/133 |
| 8,324,540 B2 * | 12/2012 | Nordh | H05B 6/68 |
| | | | 219/702 |
| 9,167,633 B2 * | 10/2015 | Ben-Shmuel | H05B 6/6402 |
| 2004/0004074 A1 | 1/2004 | Torngren et al. | |
| 2008/0087662 A1 * | 4/2008 | Takizaki | H05B 6/707 |
| | | | 219/678 |
| 2009/0057302 A1 * | 3/2009 | Ben-Shmuel | H05B 6/72 |
| | | | 219/748 |
| 2009/0107992 A1 * | 4/2009 | Akashi | F24C 7/082 |
| | | | 219/702 |
| 2010/0079215 A1 | 4/2010 | Brannan et al. | |
| 2010/0155392 A1 * | 6/2010 | Nordh | H05B 6/68 |
| | | | 219/702 |
| 2010/0224623 A1 | 9/2010 | Yasui et al. | |
| 2010/0252551 A1 | 10/2010 | Nordh | |
| 2011/0114633 A1 * | 5/2011 | Niklasson | H05B 6/705 |
| | | | 219/704 |

* cited by examiner

MICROWAVE HEATING APPARATUS AND METHOD OF OPERATING SUCH A MICROWAVE HEATING APPARATUS

CROSS REFERENCE TO RELATED APPLICATIONS

This application is a continuation of U.S. patent application Ser. No. 13/280,018, filed on Oct. 24, 2011, the entire contents of which are incorporated herein by reference.

BACKGROUND OF THE INVENTION

Technical Field

The present invention relates to the field of microwave heating, and in particular to a microwave heating apparatus for heating a load by means of microwaves.

Background

The art of microwave heating involves feeding of microwave energy in a cavity. When heating a load in the form of food by means of a microwave oven, there are a number of aspects which have to be considered. Most of these aspects are well-known to those skilled in the art and include, for instance, the desire to obtain uniform heating of the food at the same time as a maximum amount of available microwave power is absorbed in the food to achieve a satisfactory degree of efficiency.

For example, WO02/35886 discloses a microwave oven based on serial feeding of microwaves to a cavity in order to provide heating of a load that is placed in the cavity. With such serial feeding, any microwaves that are reflected from a first feeding port are directed, preferably via a microwave circulator, to a second feeding port. The microwaves that are reflected from the first feeding port are thus fed to the cavity via the second feeding port, thereby increasing the efficiency of the microwave oven. Although using such a serial feeding of microwaves improves the efficiency of the microwave oven, the heating efficiency may still be improved even further.

Thus, there is a need for providing new methods and new apparatuses that would address at least some of the above mentioned issues.

SUMMARY OF THE INVENTION

An aspect of the present invention is to wholly or partly overcome the above disadvantages and drawbacks of the prior art and to provide an improved alternative to the above technique.

Generally, it is an aspect of the present invention to provide a microwave heating apparatus with an improved heating efficiency.

This and other aspects of the present invention are achieved by means of a method and a microwave heating apparatus having the features defined in the independent claims. Preferable embodiments of the invention are characterized by the dependent claims.

Hence, according to a first aspect of the present invention, a microwave heating apparatus is provided. The microwave heating apparatus comprises a cavity, at least one microwave source, a plurality of feeding ports, a measuring unit and a control unit. The cavity is adapted to receive a load to be heated and the plurality of feeding ports is connected to the microwave source and the cavity for feeding microwaves to the cavity. The measuring unit is adapted to measure, for at least one frequency or within a frequency range, the power of microwaves reflected back to the microwave source for each one of at least part of the plurality of feeding ports. The control unit is operatively connected to the measuring unit and adapted to select at least one of the feeding ports based on the measured powers of the reflected microwaves in order to feed microwaves to the cavity via the at least one selected feeding port during operation of the microwave heating apparatus at the frequency or within the frequency range.

According to a second aspect of the present invention, a method of operating a microwave heating apparatus comprising a cavity and at least one microwave source for feeding microwaves to the cavity via a plurality of feeding ports is provided. The method comprises the step of measuring, for at least one frequency or within a frequency range, the power of microwaves reflected back to the microwave source for each one of at least part of the plurality of feeding ports. The method further comprises the step of selecting at least one of the plurality of feeding ports based on the measured powers of the reflected microwaves in order to feed microwaves to the cavity during operation of the microwave heating apparatus at the frequency or within the frequency range.

According to a third aspect of the present invention, there is provided a computer program product, loadable into a microwave heating apparatus according to the first aspect of the present invention, comprising software code portions for causing a processing means of the microwave heating apparatus to perform steps in accordance with the second aspect of the present invention. In particular, the computer program product is defined for causing the processing means to perform the steps of measuring and selecting.

The present invention makes use of an understanding that, for a microwave heating apparatus comprising a plurality of feeding ports, the feeding port via which microwaves are fed to the cavity may be selected based on powers of reflected microwaves measured for a frequency (or within a frequency range) at each one of at least part of the plurality of feeding ports. The present invention is also based on an understanding that it is preferable to make an active selection of the feeding port(s) via which the microwaves are fed to the cavity instead of providing a passive feeding system resulting from e.g. a serial feeding such as disclosed in WO02/35886. Further, it is preferable to operate the microwave heating apparatus by selecting a feeding port (or feeding ports) based on the measured powers of reflected microwaves for a frequency (or within a frequency range) rather than to operate the microwave heating apparatus based on a selection of an optimal frequency providing the highest heating efficiency (i.e. the lowest reflection) at each one of the antennas.

The present invention provides a microwave heating apparatus with improved heating efficiency since the feeding port or feeding ports for which a suitable (and preferably maximum) amount of microwaves is absorbed by the load may be selected. In particular, it is intended that the microwaves may be fed to the cavity via a feeding port (or feeding ports) providing an adequate heating efficiency at the frequency (or within the frequency range) at which the power measurements are made.

Further, as compared to prior art microwave ovens comprising a single microwave source and a single feeding port, the microwave heating apparatus of the present invention comprises a plurality of feeding ports and the number of functionalities of the microwave heating apparatus is increased, which may be desirable since microwave heating apparatuses are continuously improved to incorporate more and more functionalities and provide more and more heating capabilities.

In addition, the present invention provides a microwave heating apparatus and a method of operating a microwave heating apparatus with reduced energy consumption and it is possible to select the feeding port (or the feeding ports) providing the best coupling (or at least a sufficient coupling) to the load. In other words, the microwave heating apparatus may be operated such that most of the microwaves emitted by the microwave source are used for heating the load.

According to an embodiment, the control unit may be adapted to select at least one feeding port for which a ratio between the power emitted from the microwave source and the measured power of the reflected microwaves is above a threshold for the frequency or at a frequency within the frequency range. In other words, the control unit may be configured to select the feeding port (or feeding ports) for which the power of the reflected microwaves is below a threshold, i.e. for which the amount of microwaves absorbed in the cavity is suitable (as defined by the level of the threshold).

According to an embodiment, the feeding ports may be arranged to feed the microwaves at different locations of the cavity, which is advantageous in that it provides a microwave heating apparatus with a plurality of excitation locations, and thereby a plurality of excitation modes, in the cavity. Thus, the microwave heating apparatus of the present invention is suitable for various types of loads (or food categories) and/or various types of cooking programs.

According to an embodiment, the control unit may be configured to determine a specific frequency or a specific frequency range for performing the power measurements in accordance with input data relating to the load and/or a preselected cooking program, which is advantageous in that the heating efficiency of the microwave heating apparatus is even further improved. Indeed, from input data relating to the load and/or a preselected cooking program, the control unit may already determine which specific frequency, or which specific frequency range, is suitable (preferably the most suitable) for operating the microwave heating apparatus. In particular, the knowledge of input data relating to the load and/or of a preselected program is advantageous in that the control unit may be configured to limit the size of the frequency range, thereby limiting the number of measurements to be performed by the measuring unit. As a result, the power measurements made at the feeding ports and the selection of the feeding port(s) require less time and energy.

According to an embodiment, the control unit may be configured to select a group of feeding ports for which the measured powers of the reflected microwaves are below a threshold in a common frequency sub-range of the frequency range. In the present embodiment, the control unit may be configured to select more than one feeding port, i.e. a group of feeding ports, which provide suitable heating efficiency (i.e. for which the power of the reflected microwaves is below a threshold) in a common frequency sub-range of the frequency range. In other words, the control unit may be configured to select feeding ports providing suitable heating efficiency at frequencies relatively close to each other. The common frequency sub-range may e.g. be in the order of 10-20 MHz. For example, if two feeding ports are identified to provide suitable heating efficiency within 2470-2490 MHz, the control unit may be configured to select these two feeding ports and to operate the microwave heating apparatus at a frequency, e.g. at 2475 MHz, within this common frequency sub-range.

According to an embodiment, the microwave heating apparatus may comprise a plurality of microwave sources, each of the microwave sources being connected to a set of at least one feeding port. The present embodiment is advantageous in that it increases the total power output available from the microwave heating apparatus, thereby further improving the heating efficiency. In the present embodiment of a microwave heating apparatus using microwave sources having a limited power output, such as e.g. semiconductor-based microwave generators, each feeding port may be connected to a dedicated microwave source. The microwave heating apparatus may be designed such that a particular set of feeding ports is connected to a microwave source providing a sufficient power output for a particular application or functionality (cooking mode) of the microwave heating apparatus. Alternatively, the size (or number of feeding ports) of a set of feeding ports may be designed as a function of the available power output of the microwave source connected to it.

In particular, a set of feeding ports may comprise feeding ports feeding microwaves to a specific region of the cavity. The feeding ports may therefore be distributed (and grouped) in a number of sets of feeding ports, which, depending on their location in the cavity, are adapted to feed different regions of the cavity. As a consequence, the feeding ports or groups of feeding ports may activate different cooking modes of the microwave heating apparatus.

According to an embodiment, the control unit may be configured to select the feeding port or set of feeding ports, and optionally a frequency of the frequency range, providing the highest ratio between the power emitted from a microwave source and the measured power of the reflected microwaves. In other words, the control unit may be configured to select the feeding port or set of feeding ports, and optionally a frequency of the frequency range, providing the lowest reflection minima in the signal representative of the power of the reflected microwaves. Thus, the present embodiment further improves the heating efficiency of the microwave heating apparatus.

According to an embodiment, the control unit may be adapted to select at least two feeding ports or at least two sets of feeding ports for which the measured powers of the reflected microwaves are below a threshold in two different sub-ranges, respectively, of the frequency range. Further, the control unit may be adapted to operate the microwave heating apparatus by switching between the two selected feeding ports or the two selected sets of feeding ports. The present embodiment improves the heating uniformity in the cavity of the microwave heating apparatus since the microwaves are fed in the cavity via two separate feeding ports or separate sets of feeding ports. In particular, the feeding ports or sets of feeding ports may be selected to feed microwaves in complementary regions of the cavity (or complementary cooking modes).

According to an embodiment, the control unit may be adapted to select at least one feeding port (or set of feeding ports), for feeding microwaves to the cavity during operation of the microwave heating apparatus, based on input data relating to the load or a preselected cooking program, further improving the heating efficiency. For example, the heating efficiency may be improved by selecting the feeding port (or set of feeding ports) considering both the coupling of microwave energy to the load (via the measured powers of the reflected microwaves) and e.g. the location of the load in the cavity.

According to an embodiment, the control unit may be configured to determine the part of the plurality of feeding ports for which the measuring unit is to measure the power of reflected microwaves based on input data relating to the load or a preselected cooking program. In the present embodiment, the measurements of the powers of the reflected microwaves at the frequency or within the frequency range may not be performed for all feeding ports of the plurality of feeding ports but, instead, for only some of the plurality of feeding ports, thereby requiring less time and energy for the measurement and for the selection of the appropriate feeding port(s) (or set of feeding ports). Based on input data relating to the load (e.g. the location of the load) or information about a preselected cooking program, the control unit may already determine that some of the feeding ports (or sets of feeding ports) are not suitable and measurements of the powers of the reflected microwaves are not necessary at these feeding ports.

According to an embodiment, the microwave source(s) may be a frequency controllable microwave generator or a solid-state based microwave generator (such as a semiconductor-based microwave generator).

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
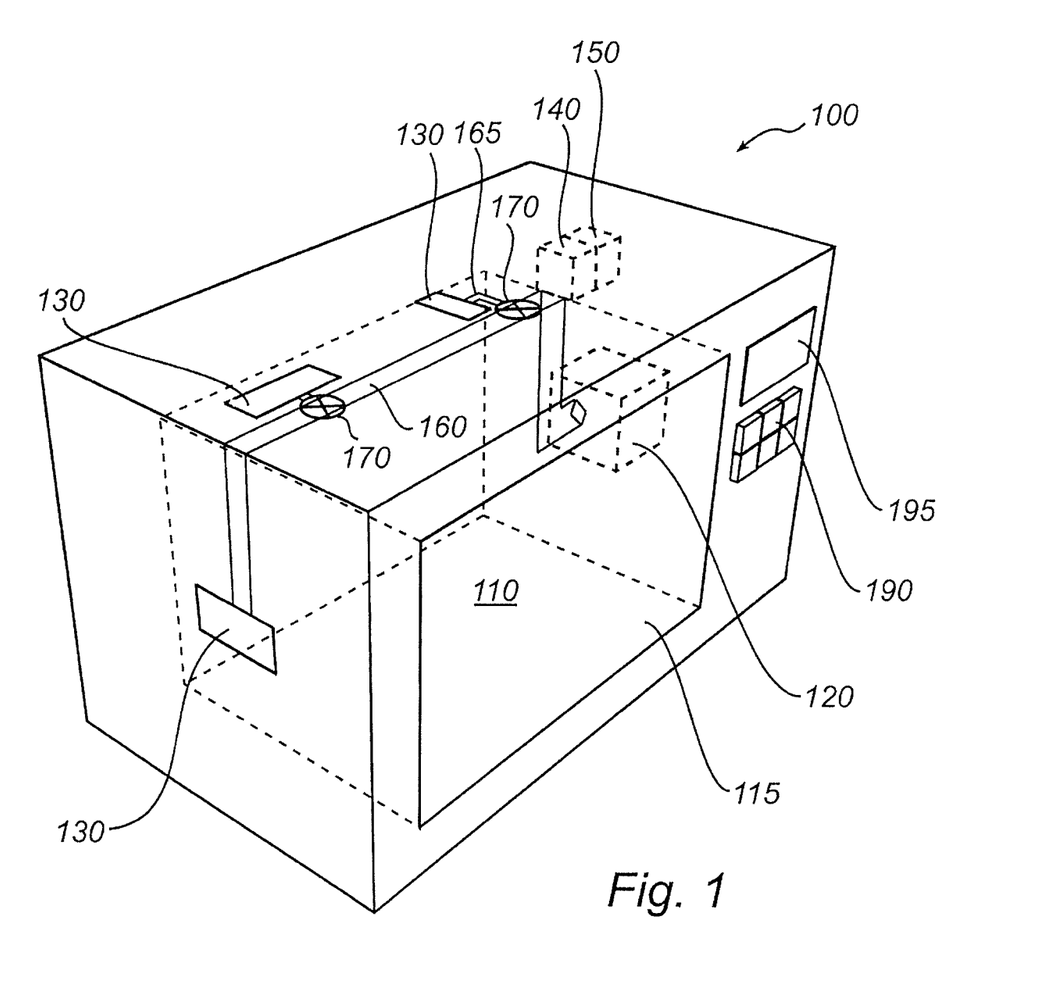
FIG. 1 schematically shows a microwave heating apparatus according to an embodiment of the present invention.

With reference to FIG. 1, there is shown a microwave heating apparatus 100, e.g. a microwave oven, having features and functions according to an embodiment of the present invention.

The microwave oven 100 comprises a cavity 110 defined by an enclosing surface. One of the side walls of the cavity 110 may be equipped with a door 115 for enabling the introduction of a load, e.g. food, in the cavity 110. Further, the cavity 110 may be provided with a plurality of feeding ports (or antennas) 130 through which microwaves are fed to the cavity 110 of the microwave oven 100. For example, in FIG. 1, the microwave oven is equipped with three feeding ports. A feeding port may for instance be an antenna, such as a patch antenna or a H-loop antenna, or even an aperture in a wall (including sidewalls, the bottom and the ceiling) of the cavity 110. In the following, reference is made to the term feeding port in general. However, the terms "feeding port" and "antenna" are, in the present application, interchangeable.

The microwave oven 100 further comprises a microwave source 120 connected to the plurality of feeding ports 130 of the cavity 110 by means of a transmission line or waveguide 160. The transmission line 160 may for instance be a coaxial cable. For guiding the microwaves from the microwave source 120 to the feeding ports 130, a feeding structure may be provided. The feeding structure may comprise the main waveguide or transmission line 160 and, optionally, a plurality of secondary waveguides or transmission lines 165, branching from the main waveguide or transmission line 160, for guiding the microwaves from the microwave source 120 to the feeding ports 130.

Optionally, the microwave oven may comprise switches 170, each being associated with a feeding port 130, arranged in the transmission line 160 for stopping the feeding from a respective feeding port 130.

Further, the microwave oven 100 comprises a measuring unit (or measuring means) 140 for obtaining, or being adapted to obtain, a signal representative of the power reflected from the cavity 110, for at least one frequency or within a frequency range, for each one of at least part of the plurality of feeding ports 130. The measuring unit may then perform the power measurements for all three feeding ports or for only two feeding ports. The power measurements are advantageously performed sequentially at the various feeding ports 130 by feeding microwaves at a first feeding port and measuring the power of the reflected microwaves at this first feeding port without feeding any microwaves at the other feeding ports. For this purpose, the optional switches 170 (or any other blocking means) may be used for blocking transmission of microwaves to the cavity 110 via the other feeding ports. The power measurement is then performed for the second feeding port and then for the third feeding port.

Generally, microwaves transmitted to a cavity may be either absorbed by the load arranged in the cavity, absorbed by elements of the cavity (or other objects present in the cavity), or reflected back from the cavity (or feeding port). Indeed, if the coupling to the cavity 110 is not perfect, some microwave power will be reflected back through the feeding ports 130, back into the transmission line 160 towards the microwave source. A method to control whether there is a satisfactory coupling to the cavity 110, is by measuring the power that is reflected from a feeding port 130, e.g. at a switch 170. The powers of the reflected microwaves measured by the measuring unit 140 are therefore, at least partly, representative of the amount of microwaves absorbed by the load in the cavity 110.

Further, the microwave oven 100 comprises a control unit 150 operatively connected to the measuring unit 140. The result of the measurement performed by the measuring unit, i.e. the signal representative of the power of the reflected microwaves for each one of at least part of the plurality of feeding ports 130, is transmitted to the control means or unit 150. The control unit 150 is configured to selected at least one of the feeding ports based on the measured powers of the reflected microwaves. The control unit 150 is then configured to operate the microwave heating apparatus 100, i.e. feed microwaves to the cavity 110 during operation of the microwave heating apparatus 100 for heating a load arranged in the cavity 110, at the frequency (at which the power measurements were performed) or at a frequency within the frequency range (used for performing the power measurements) using the selected feeding port(s).

The measuring unit 140 may be either integrated as a sub-unit in the control unit 150 or arranged as a separate unit connected to the control unit 150. As an alternative, the optional switches 170 may each comprise sub-units or sensing parts of the measuring unit 140 for measuring the power of the reflected microwaves. As another alternative, the sensing part(s) of the measuring unit 140 may be a probe comprising a field-sensor at its extremity for sensing the energy reflected from the cavity. As yet another alternative, the measuring unit 140 may comprise a directional coupler arranged in proximity to a feeding port 130 and in proximity to, or in connection with, the transmission line 160 connecting the microwave source 120 and a feeding port 130.

If a frequency range is used, the control unit 150 may be connected to the microwave source 120 and the measuring unit 140 such that the microwave source 120 sweeps its frequency across the frequency range and the measuring unit 140 obtains signals representative of the powers of the microwaves reflected from the cavity 110 within this frequency range. The control unit 150 is further configured to identify the feeding port(s) 130 suitable for operating the microwave heating apparatus 100 within the frequency range based on the obtained signals. As a result, for heating a load arranged in the cavity 110, the microwaves will be fed via the identified or selected feeding port(s) 130 at a frequency comprised within the frequency range.

In particular, the control unit 150 may be adapted to select at least one feeding port 130 for which a ratio between the power emitted from the microwave source 120 and the measured power of the reflected microwaves is above a threshold for the frequency at which the measurement is made. Alternatively, the control unit 150 may be adapted to select at least one feeding port 130 for which a ratio between the power emitted from the microwave source 120 and the measured power of the reflected microwaves is above a threshold at a frequency comprised within the frequency range.

The normal bandwidth for operation of microwaves using e.g. solid-state based generators is in the range of 2.4 to 2.5 GHz. In this case, the frequency range may then be in the order of e.g. 100 MHz. However, the present invention is not limited to such a range of frequencies and the microwave source 120 could be adapted to emit in a range centered at 915 MHz, for instance 875-955 MHz, or any other suitable range of frequency (or bandwidth). The present invention is for instance applicable for standard microwave sources having mid-band frequencies of 915 MHz, 2450 MHz, 5800 MHz and 22.125 GHz.

According to an embodiment, the size of the frequency range may be limited by the control unit 150, as will be further explained in some of the embodiments described below.

Further, the powers of the reflected microwaves may be measured by the measuring unit 140 at the beginning of an operation cycle and the feeding port(s) used for operating the microwave heating apparatus 100 (i.e. for heating a load arranged in the cavity) selected in accordance with the above. However, it is also contemplated that the measuring unit 140 may be adapted to, continuously or periodically, monitor the signals representative of the powers of the reflected microwaves to dynamically (i.e., during an operation cycle) select the appropriate feeding port(s). For the synchronization of the power measurements in relation to, or within, the operation cycle, the microwave oven 100 may further comprise a clock system (not shown in FIG. 1 but in FIG. 3). The clock system may also be employed for synchronizing the measurements at the various feeding ports 130 since the power measurements are advantageously performed by activating only one feeding port at a time.

In particular, it is contemplated that, while the power measurements may be initially performed within a first frequency range, e.g. from 2.4-2.5 GHz, for the selection of the appropriate feeding ports at the beginning of an operation cycle, the control unit 150 may be configured to limit the frequency range, to e.g. 2.45-2.48 GHz, for performing any subsequent power measurements. The control unit 150 may be configured to limit the size of the frequency range based on the result of the initial power measurements. Consequently, power consumption and processing time are further reduced.

According to an embodiment, the microwave source 120 may be a frequency-controllable microwave source, a solid-state based microwave generator or a magnetron.

According to an embodiment, the control unit 150 may be configured to determine a specific frequency or a specific frequency range at which or within which the power measurements are to be performed in accordance with input data relating to the load and/or a preselected cooking program. For this purpose, the microwave oven 100 may be provided with push buttons and knobs, as denoted by 190 in FIG. 1, for setting operation parameters such as cooking function and food category, as well as a display 195. The input data relating to the load may e.g. be its size, volume, height, weight and/or position in the cavity 110. Optionally, such parameters or some of these parameters may be obtained via sensing means of the microwave heating apparatus 100. As a result, from e.g. the food category or position in the cavity 110, the control unit 150 may already identify a specific frequency range or even a specific frequency within which or at which it is suitable to operate the microwave oven 100.

According to an embodiment, in addition to the measured powers of the reflected microwaves, the control unit 150 may also be adapted to select the feeding port (or set of feeding ports) for feeding microwaves in the cavity during operation of the microwave heating apparatus 100 based upon input data relating to the load and/or a preselected cooking program. Thus, although a feeding port (or set of feeding ports) does not provide the lowest power of reflected microwaves, such a feeding port (or set of feeding ports) may be preferred before a feeding port resulting in a lower power of reflected microwaves because its location is more suitable in view of, e.g., the position of the load, the food category or the preselected cooking program.

Further, at a specific frequency, feeding ports (or sets of feeding ports) arranged at different locations in the cavity may provide different excitation modes. The control unit 150 may then be configured to, in addition to the measured powers of reflected microwaves, select the feeding port(s) 130 providing the most suitable excitation mode (among the feeding ports providing a sufficiently low power of reflected microwaves) based on input data relating to the load and/or a preselected cooking program.

According to an embodiment, still based on the data relating to the load and/or the preselected cooking program, the control unit 150 may be configured to determine the part of the plurality of feeding ports 130 (or sets of feeding ports) for which the measuring unit 140 is to measure the power of reflected microwaves.

Figure 2:
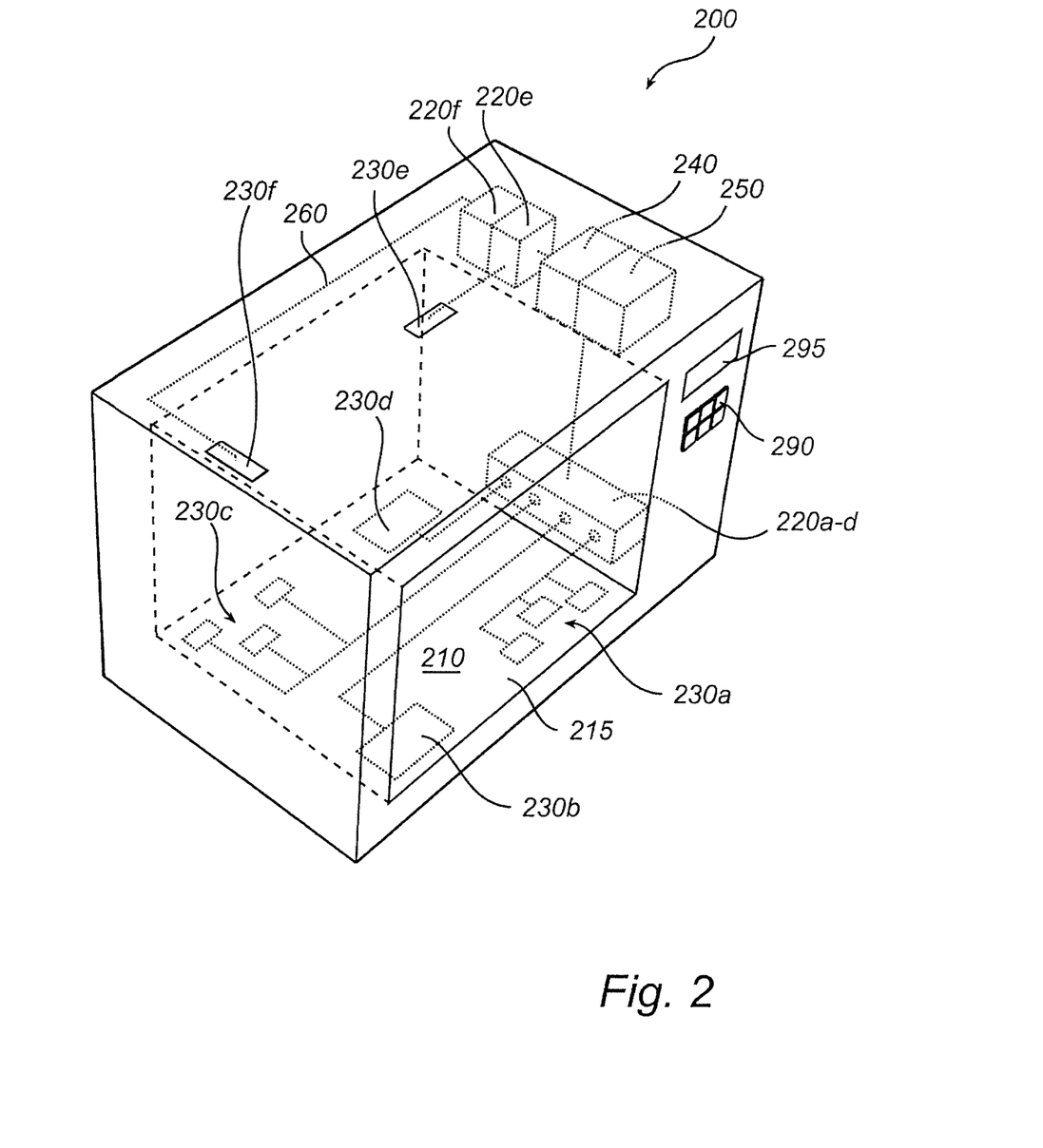
FIG. 2 schematically shows another microwave heating apparatus according to another embodiment of the present invention.

With reference to FIG. 2, there is shown a microwave heating apparatus 200, e.g. a microwave oven, having features and functions according to another embodiment of the present invention.

The microwave oven 200 is equivalent to the microwave oven 100 described with reference of FIG. 1 except that it comprises a larger number of feeding ports, denoted 230a-230f. In particular, the microwave oven 200 comprises a measuring unit 240 and a control unit 250 operating in a similar manner as the measuring unit 140 and the control unit 150, respectively, in the embodiments described above with reference to FIG. 1. The microwave oven 200 comprises feeding ports 230a-230d at the bottom of the cavity 210, wherein reference number 230a denotes a first set of three feeding ports and reference number 230c denotes a second set of three feeding ports, and feeding ports 230e-230f at the ceiling of the cavity 210. The feeding ports or sets of feeding ports 230a-230f are arranged to feed microwaves at different locations of the cavity 210 of the microwave oven 200 and thereby may provide microwaves for activating different functions of the microwave oven 200. The microwave oven 200 differs also from the microwave oven 100 described with reference to FIG. 1 in that each of the feeding ports (or sets of feeding ports) 230a-230f is connected to a dedicated microwave source 220a-220f, respectively. For example, the set 230a of three feeding ports is connected to a first microwave source denoted 220a and the feeding port 230f is connected to another microwave source denoted 220f.

It will be appreciated that in the present embodiment, for performing the power measurement in a sequential manner at the various feeding ports 230a-230f of the microwave oven 200, there is no need of switches or blocking means. Instead, the power measurements may be sequentially performed by sequentially activating the microwave sources 220a-220f. In other words, for measuring the power of reflected microwaves at the set of feeding ports denoted 230a, the microwave source denoted 220a will be activated (at the frequency or within the frequency range) while the other microwave sources denoted 220b-220f will not be activated.

According to an embodiment, the control unit 250 may be configured to select a group of feeding ports for which the respective measured powers of the reflected microwaves are below a threshold in a common frequency sub-range of the frequency range. For example, after the measurements performed by the measuring unit 240, the control unit 250 may identify that the feeding port denoted 230e and arranged at the ceiling of the cavity 210 and the set of three feeding ports denoted 230c and arranged at the bottom of the cavity 210 result in measured powers of reflected microwaves that are below a threshold within a sub-range of the (specific) frequency range (e.g. within a sub-range of 5 MHz of a specific frequency range of 20 MHz or, as another example, within a sub-range of 5 MHz of a standard frequency range of 100 MHz). The control unit 250 may then also identify that the other feeding ports (or set of feeding ports) 230a, 230b and 230d result in measured powers of reflected microwaves that are above the threshold and that the feeding port denoted 230f results in a measured power of reflected microwaves that is below the threshold but at a frequency significantly distinct (e.g. by more than 5 MHz) from the sub-range defined for feeding ports 230c and 230e. The control unit 250 may then be adapted to operate the microwave heating apparatus 200 using feeding ports 230c and 230e at a (common) frequency within the common sub-range of the frequency range for which the measured powers are below the threshold. The control unit may be configured to determine the (common) operating frequency by integration of the result of the power measurements over the common frequency sub-range for feeding ports 230c and 230e.

According to yet another embodiment, the control unit 250 may be adapted to select at least two feeding ports, or at least two sets of feeding ports, for which the measured powers of the reflected microwaves are below a threshold in two different sub-ranges, respectively, of the frequency range. Thus, still based on the above example described with reference to FIG. 2, the control unit 250 may be adapted to select, on the one hand, feeding ports 230c and 230e for which the measured powers are below a threshold in a first sub-range and, on the other hand, feeding port 230f for which the measured power is below the threshold at a frequency distinct from the first sub-range (or in a second sub-range). The control unit 250 may then be adapted to operate the microwave heating apparatus 200 by switching between the two groups of selected feeding ports. For example, the control unit 250 may operate the microwave oven 200 by alternatively feeding microwaves from feeding ports 230c and 230e (at a frequency within the first sub-range) during a first time period of an operation cycle of the microwave oven 200 and from feeding port 230f at another frequency (not comprised within the first sub-range) during a second time period of the operation cycle.

According to an embodiment, the control unit 250 may be configured to select the feeding port or set of feeding ports, and optionally a frequency within the frequency range, providing the highest ratio between the power emitted from the microwave source and the measured power of the reflected microwaves.

The microwave oven 200 described with reference to FIG. 2 may also be equipped with push buttons 290 and a display 295 functioning in a similar manner, and having the same purpose, as the push buttons 190 and the display 195 described with reference to FIG. 1. Further, the cavity 210 may normally be equipped with a door 215 at one of its sides.

Figure 3:
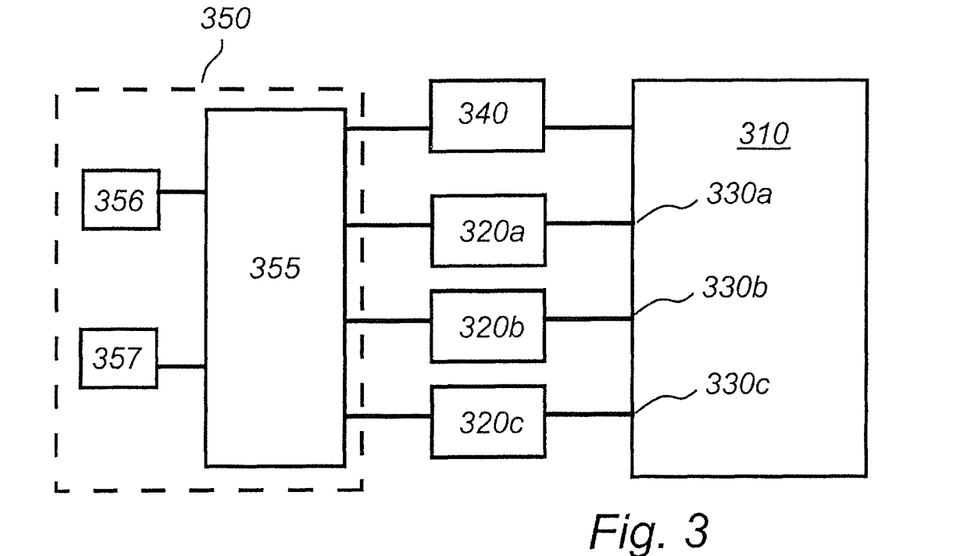
FIG. 3 shows a block diagram illustrating the general functions of a microwave heating apparatus according to an embodiment of the present invention.

The general function of a microwave heating apparatus, e.g. a microwave oven, according to an embodiment of the present invention is further illustrated in FIG. 3 in the form of a block diagram. The microwave sources or generators 320a-c feed microwaves to the cavity 310 via a plurality of antennas or feeding ports 330a-c, respectively. The signals representative of the powers of the reflected microwaves are obtained by a measuring unit 340 for at least one frequency or within a frequency range. The obtained signals are then transmitted to the control unit 350. The control unit 350 may comprise a processor or processing means 355 for analyzing the obtained signals and identify the feeding port(s) providing a signal below a predetermined threshold. Alternatively, the control unit 350 may be configured to identify the feeding port(s) for which the ratio between the power level of the microwaves transmitted to the cavity and the power level of the reflected microwaves is above a predetermined threshold. In other words, the control unit is configured to identify the feeding port(s) providing a suitable (and advantageously the best) coupling of microwaves to a load arranged in the cavity 310.

As mentioned above in connection to FIG. 1, the control unit 350 may further comprise a clock system 356 for synchronizing switching between feeding of microwaves from different feeding ports or sets of feeding ports 320a-320c or even synchronizing the power measurements made at the various feeding ports 320a-320c.

Further, the control unit 350 may also comprise receiving means 357 for receiving input data relating to the load and/or information about a preselected cooking program (or cooking mode). The input data and information about the preselected cooking program may be entered by a user using input means such as described above in connection to FIGS. 1 and 2.

The measuring unit 340 and the control unit 350 may be configured to operate in a similar manner as the measuring units 140, 240 and the control units 150, 250, respectively, described above with reference to FIGS. 1 and 2.

Figure 4:
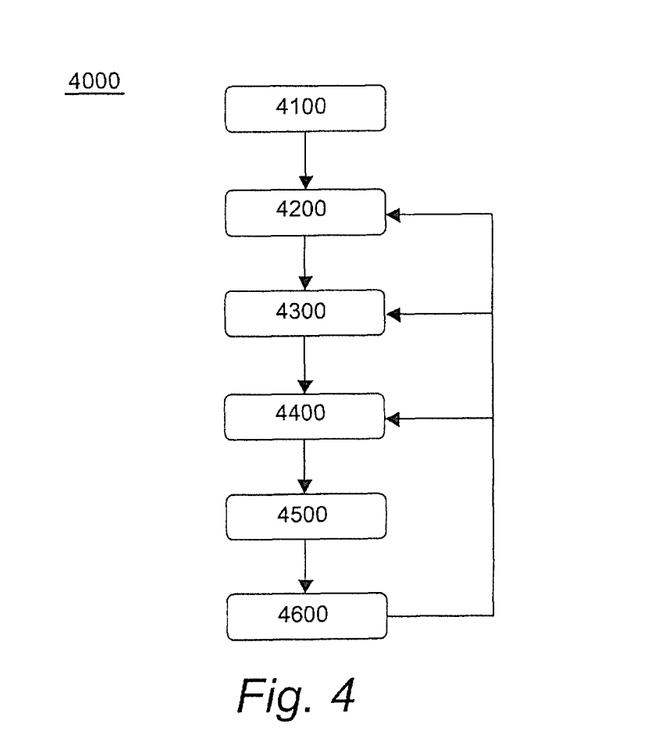
FIG. 4 is a general outline of a method of operating a microwave heating apparatus in accordance with an embodiment of the present invention.

With reference to FIG. 4, a method of operating a microwave heating apparatus comprising a cavity and at least one microwave source for feeding microwaves to the cavity via a plurality of feeding ports is described.

The method may comprise an optional first step 4100 of acquiring input data relating to the load or a preselected cooking program.

Further, the method may comprise another optional step 4200 of determining the feeding port(s) for which a measurement of the power of the microwaves reflected back to the microwave source is to be performed. The microwave heating apparatus may advantageously do such a determination based upon the information acquired at step 4100. If the present optional step 4200 of pre-selection of feeding ports is omitted, the measurements of the powers of the microwaves reflected will then be performed for all available feeding ports of the microwave heating apparatus.

Further, still based on the information acquired at step 4100, the microwave heating apparatus may select, at another optional step 4300, a specific frequency range or a specific frequency within which or at which the power measurements at the plurality of feeding ports are to be performed. If the present optional step 4300 of pre-selection of optimal frequency or frequency range is omitted, the measuring unit of the microwave heating apparatus will then be configured to measure the powers of the reflected microwaves within the normal frequency range available at the microwave source (i.e. without any particular restriction with respect to information relating to the load or a preselected cooking mode).

Further, the method comprises the step 4400 of measuring, for the (specific) frequency or within the (specific) frequency range, powers of the microwaves reflected back to the microwave source for all or for each one of at least part of the plurality of feeding ports.

Then, the method comprises the step 4500 of selecting at least one of the plurality of feeding ports based on the measured powers for operating the microwave heating apparatus (i.e. feeding microwaves in the cavity for heating a load) at the (specific) frequency or at a frequency within the (specific) frequency range.

According to an embodiment, the power measurements performed at step 4400 and the selection of the appropriate feeding port(s) performed at step 4500 may be repeated at predetermined time intervals during an operation cycle. The method or process described with reference to FIG. 4 may therefore further comprise an idle step 4600 (during which no power measurement is performed) before returning to either one of step 4400 of measuring the powers of the reflected microwaves, step 4200 of preselecting the appropriate feeding ports or step 4300 of preselecting a specific frequency (or specific frequency range), depending on whether these parameters (frequency, frequency range and/or feeding ports) are to be changed between two successive measurement sessions. The duration of the time interval between two measurement sessions may depend on the preselected cooking mode and in particular on the total duration of the operation cycle for this preselected cooking mode. The duration of the time interval may for instance be in the order of 1-10 minutes. It will however be appreciated that the duration of the time interval between two measurement sessions may also depend on the duration of the measurement session itself, i.e. on the time it takes to perform the measurements. It is indeed preferable if the power measurements and the analysis of the measurements occupy only a minor part of an operation cycle. Alternatively, or in addition, it will be appreciated that the frequency of the measurement sessions may vary whether the operation cycle is in a crucial part of the heating process. Thus, depending on whether it is expected or detected that something happens in the cavity (like a change in geometry and/or phase of the load from e.g. frozen to thawed), the power measurements and selection of the antenna(s) may be repeated more or less frequently.

Further, it will be appreciated that the idle step concern the power measurements made by the measuring unit and the selection of the appropriate feeding ports performed by the control unit of the microwave heating apparatus. However, during such an idle step, the microwave heating apparatus may still be active and, in particular, the control unit may be active for operating the microwave heating apparatus in accordance with the result of the last performed steps 4400 and 4500 of power measurement and of selection of the appropriate feeding port(s).

It will be appreciated that any one of the embodiments described above with reference to FIGS. 1-3 is combinable and applicable to the method described herein with reference to FIG. 4.

The present invention is applicable for domestic appliances such as a microwave oven using microwaves for heating. The present invention is also applicable for larger industrial appliances found in e.g. food operation. The present invention is also applicable for vending machines or any other dedicated applicators.

The method of the present invention as described above may also be implemented in a computer program that, when executed, performs the inventive method in a microwave heating apparatus. The computer program may, for example, be downloaded as an upgrade into a microwave heating apparatus, e.g. a microwave oven, already comprising a plurality of feeding ports connected to at least one microwave source.

While specific embodiments have been described, the skilled person will understand that various modifications and alterations are conceivable within the scope as defined in the appended claims.

For example, although the microwave ovens 100 and 200 described with reference to FIGS. 1 and 2 have a rectangular enclosing surface, it will be appreciated that, in the present invention, the cavity of the microwave oven is not limited to such a shape and may, for instance, have a circular cross section.

For example, the steps of the method described with reference to FIG. 4 may be performed in another order than that described above, in particular for steps 4200 and 4300.

What is claimed is:

1. A microwave heating apparatus comprising:
a cavity adapted to receive a load to be heated;
at least one microwave source generating microwaves within a frequency bandwidth;
a plurality of feeding ports connected to the at least one microwave source and the cavity for feeding the microwaves to the cavity;
a measuring unit configured to measure, within a frequency range smaller than the frequency bandwidth, a power of microwaves reflected back to the at least one microwave source for each one of at least a part of the plurality of feeding ports; and a control unit operatively connected to the measuring unit and configured to select at least one frequency within the frequency range smaller than the frequency bandwidth and at least one of the plurality of feeding ports based on the measured power of the reflected microwaves in order to feed the microwaves to the cavity via the at least one selected feeding port during operation of the microwave heating apparatus at the at least one frequency.

2. The microwave heating apparatus of claim 1, wherein the feeding ports are arranged to feed the microwaves at different locations of the cavity.

3. The microwave heating apparatus of claim 1, wherein the control unit is configured to determine the frequency range for performing the power measurements in accordance with input data relating to at least one of the load and a preselected cooking program.

4. The microwave heating apparatus of claim 1, wherein the control unit is configured to select a group of feeding ports for which respective measured powers of the reflected microwaves are below a threshold in a common frequency sub-range of said frequency range.

5. The microwave heating apparatus of claim 1, further comprising a plurality of microwave sources, each of the plurality of microwave sources being connected to the at least one feeding port.

6. The microwave heating apparatus of claim 1, wherein the control unit is configured to select the at least one of the plurality of feeding ports, and the at least one frequency of the frequency range, providing the highest ratio between the power emitted from the at least one microwave source and the measured power of the reflected microwaves.

7. The microwave heating apparatus of claim 1, wherein said control unit is adapted to:

select at least two feeding ports, or at least two sets of feeding ports, for which the measured powers of the reflected microwaves are below a threshold in two different sub-ranges, respectively, of the frequency range; and operate the microwave heating apparatus by switching between at least two selected feeding ports or at least two selected sets of feeding ports.

8. The microwave heating apparatus of claim 5, wherein the at least one of the feeding ports further comprises a set of feeding ports feeding microwaves to a specific region of the cavity.

9. The microwave heating apparatus of claim 1, wherein said control unit is adapted to select, for feeding the microwaves to the cavity during operation of the microwave heating apparatus, at least one feeding port or set of feeding ports from the plurality of feeding ports based upon input data relating to the load or a preselected cooking program.

10. The microwave heating apparatus of claim 1, wherein the control unit is configured to determine, based on input data relating to the load or a preselected cooking program, the part of the plurality of feeding ports for which the measuring unit is to measure the power of the reflected microwaves.

11. The microwave heating apparatus of claim 1, wherein said at least one microwave source is a frequency controllable microwave generator.

12. The microwave hearing apparatus of claim 1, wherein the microwave heating apparatus is configured to feed the microwaves to the cavity only via the at least one selected feeding port during operation at the at least one frequency.

13. A microwave heating apparatus comprising:
a cavity adapted to receive a load to be heated;
at least one microwave source generating microwaves within a supplied frequency range;
a plurality of feeding ports connected to the at least one microwave source and the cavity for feeding the microwaves to the cavity;
a measuring unit configured to measure, within a frequency range smaller than the supplied frequency bandwidth, a power of microwaves reflected back to the at least one microwave source for each one of at least a part of the plurality of feeding ports; and
a control unit operatively connected to the measuring unit and including a processor configured to select at least one frequency within the frequency range and at least one of the plurality of feeding ports based on the measured power of the reflected microwaves in order to feed the microwaves to the cavity via the at least one selected feeding port during operation of the microwave heating apparatus at the at least one frequency.

14. The microwave heating apparatus of claim 13, wherein the processor is further configured to select the at least one of the feeding ports for which a ratio between the power emitted from the microwave source and the measured power of the reflected microwaves is above a threshold for the at least one frequency.

15. The microwave heating apparatus of claim 13, wherein the processor is configured to determine the frequency range for performing the power measurements in accordance with input data relating to at least one of the load and a preselected cooking program.

16. The microwave heating apparatus of claim 15, wherein the processor is configured to perform power measurement sequentially across a sub-range of said frequency range.

17. The microwave heating apparatus of claim 13, wherein the processor is configured to select the at least one of the plurality of feeding ports, and the frequency of the frequency range, providing the highest ratio between the power emitted from the at least one microwave source and the measured power of the reflected microwaves.

18. The microwave heating apparatus of claim 13, wherein said processor is adapted to select, for feeding the microwaves to the cavity during operation of the microwave heating apparatus, at least one feeding port or set of feeding ports from the plurality of feeding ports based upon input data relating to the load or a preselected cooking program.

19. The microwave heating apparatus of claim 13, wherein the processor is configured to determine, based on input data relating to the load or a preselected cooking program, the part of the plurality of feeding ports for which the measuring unit is to measure the power of the reflected microwaves.

20. The microwave heating apparatus of claim 1, wherein the control unit is further configured to select the at least one of the feeding ports for which a ratio between the power emitted from the microwave source and the measured power of the reflected microwaves is above a threshold for the at least one frequency.

* * * * *